July 8, 1952      G. T. NEUNDORFER      2,602,267
PORTABLE TWO-DIRECTIONAL AGRICULTURAL HEATER
Filed March 14, 1949      2 SHEETS—SHEET 1
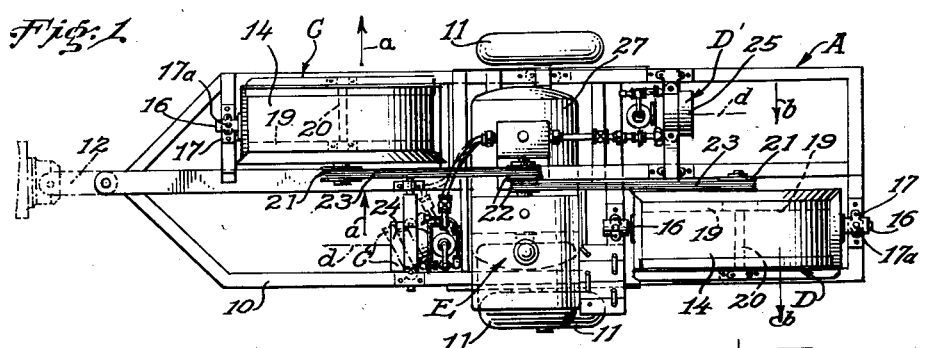
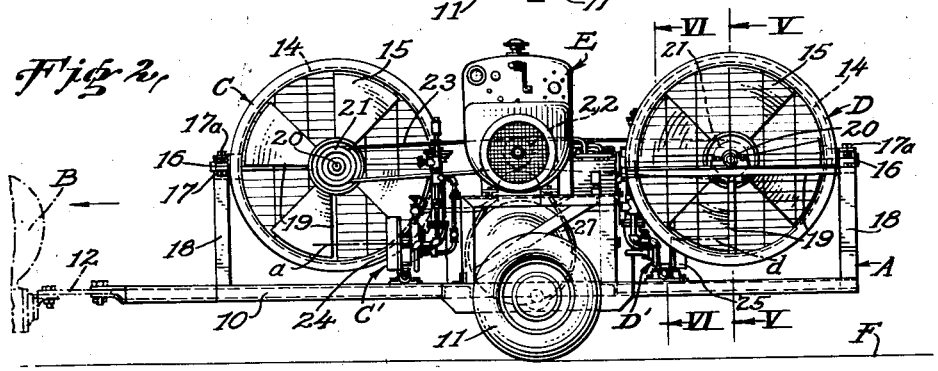
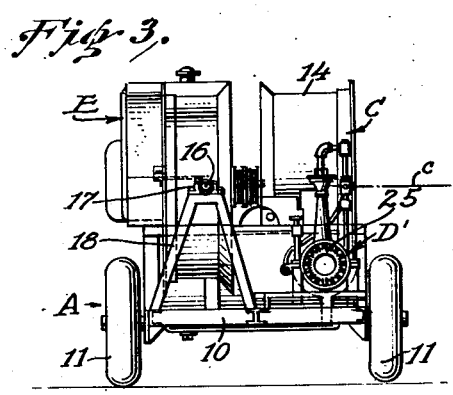
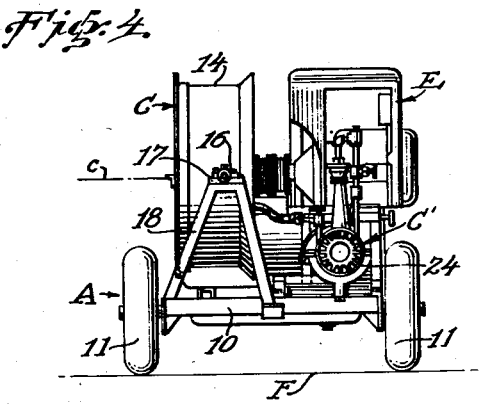
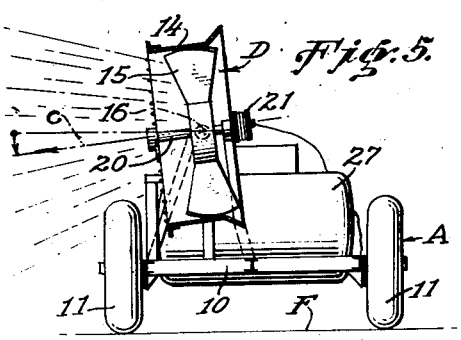
INVENTOR.
GEORGE T. NEUNDORFER.
BY
Munn, Liddy & Glaccum
ATTORNEYS

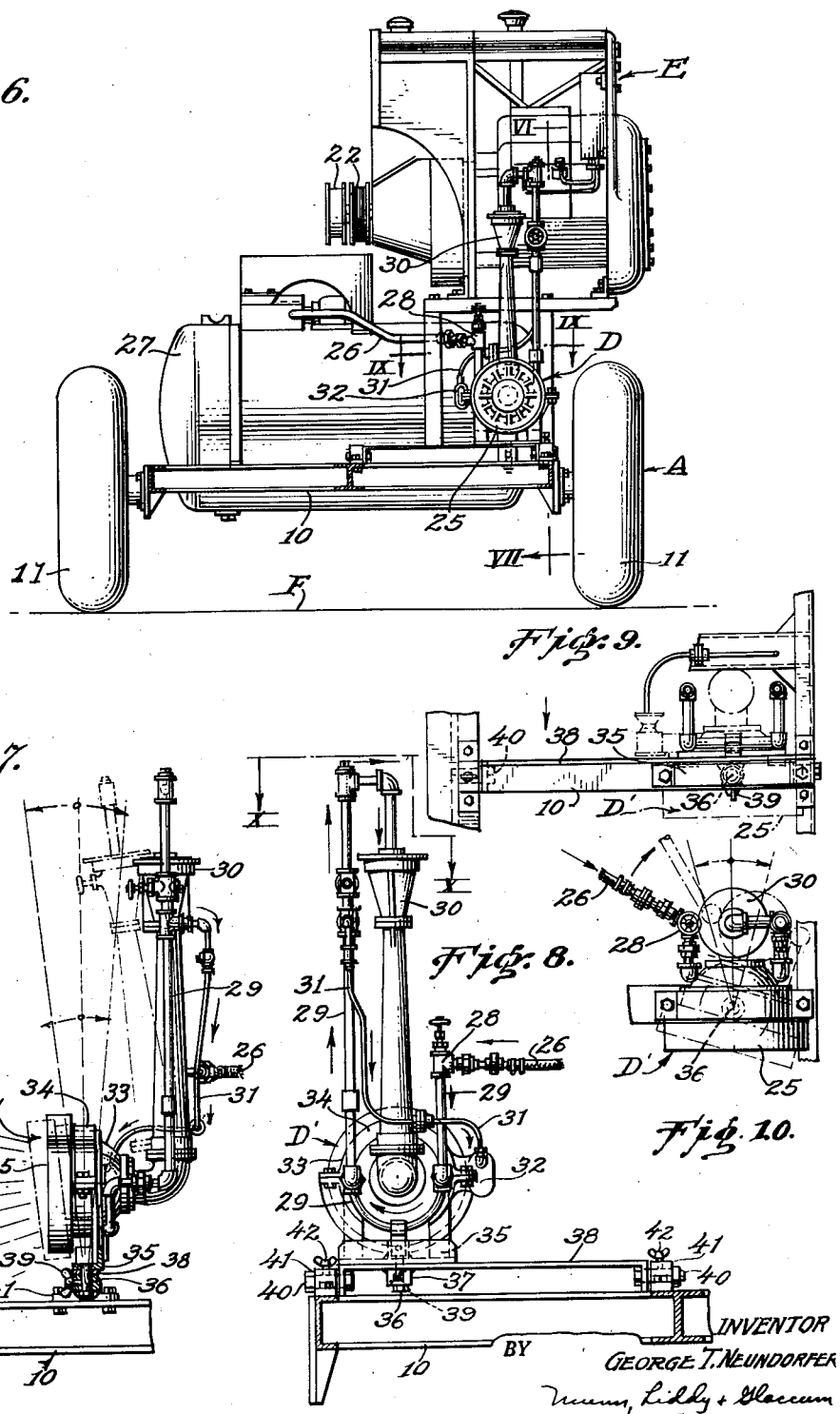

Patented July 8, 1952

2,602,267

UNITED STATES PATENT OFFICE 2,602,267

PORTABLE TWO-DIRECTIONAL AGRICULTURAL HEATER

George T. Neundorfer, Chico, Calif.

Application March 14, 1949, Serial No. 81,267

5 Claims. (Cl. 47—2)

The present invention relates to improvements in a portable agricultural heater. It consists of the combinations, constructions and arrangement of parts, as hereinafter described and claimed.

It is an expensive proposition to maintain smudge pots, or stack-type heaters, for heating orchards to prevent frost damage to any plant life ordinarily subject thereto. In practically every case, where there is a below-freezing temperature of approximately 28° Fahrenheit, the product being grown will not become frost bitten, if the atmosphere surrounding the product is raised periodically in temperature about 4° Fahrenheit every half hour. In the interim between heating the prevailing temperature may be permitted to drop again towards 28° Fahrenheit without damage to the product.

Taking into consideration the time element before which frost damage occurs, I propose to provide an agricultural heater that may be moved into an area periodically, depending upon the temperature, condition of plant life, moisture content of the air, etc.

Accordingly, an object of my invention is to provide a portable agricultural heater adapted to be moved through the area to be heated, making frequent trips therethrough so that no portion of the area will be without sufficient heat long enough to permit frost damage to the product.

The fuel consumed by my heater is appreciably less than that required to maintain smudge pots, or stack-type heaters. When utilizing such pots and stack-type heaters, the entire area to be protected must be maintained at an atmospheric temperature above freezing. The heating provided by my portable heater is carried out periodically at intervals of time that will prevent frost damage to the crop.

From actual tests, I have found that blowing hot air periodically over a given area about every six minutes will raise the atmospheric temperature from a below-freezing temperature of 28° Fahrenheit to a temperature above freezing so that the growing crop will not suffer damage.

It is further proposed in this invention to provide a portable agricultural heater, which is compact in construction, durable and efficient for the purpose intended.

More specifically described, I provide an apparatus having a pair of fans facing in opposite directions, and these fans may be tilted about horizontal axis to direct heated air downwardly at a slight angle. This will compensate for the natural tendency of the heated air to rise. These fans are placed one in front of the other, when considering the direction of travel taken by the apparatus. One fan directs a heated air stream laterally in one direction, while the other fan directs its heated air stream in the opposite direction.

Other objects and advantages will appear as the specification continues. The novel features of my invention will be set forth in the claims hereunto appended.

For a better understanding of the invention, reference should be had to the accompanying drawings, forming part of this application, in which:

Figure 1 is a top plan view of a portable agricultural heater constructed in accordance with my invention;

Figure 2 is a side elevation thereof;

Figures 3 and 4 are rear and front elevations, respectively, of my apparatus;

Figures 5 and 6 are vertical transverse sectional views taken along the lines V—V and VI—VI, respectively, of Figure 2;

Figure 7 is a vertical sectional view taken along the line VII—VII of Figure 6 illustrating a burner that may be tilted about a horizontal axis;

Figure 8 is a view looking at the right-hand side of Figure 7;

Figure 9 is a horizontal sectional view taken along the line IX—IX of Figure 6; and Figure 10 is a top plan view of one of the burners as seen from the line X—X of Figure 8.

While I have shown only the preferred form of my invention, it should be understood that various changes, or modifications, may be made within the scope of the annexed claims without departing from the spirit thereof.

In carrying my invention into practice, I provide a chassis indicated generally at A, which includes a frame 10 supported on a pair of wheels 11. The forward end of this frame is adapted to be coupled to a towing vehicle B by a draft bar 12. It will be understood, of course, that the chassis may be drawn through orchards, fields and the like, wherein various crops are grown that must be protected against frost damage.

While en route through an orchard, field, or the like, hot air streams are discharged laterally of the chassis A in opposite directions by fans designated generally at C and D. Burners C' and D' are associated with the fans C and D, respectively, in order to heat air streams flowing through tubular shields 14 surrounding the blades 15 of these fans.

The fans C and D are mounted on opposite sides of the longitudinal axis of the chassis A, as clearly shown in Figure 1. These fans are spaced apart, and an engine E, or other suitable prime mover, is interposed therebetween. Likewise, the burners C' and D' are arranged on opposite sides of the chassis, with the burner C' disposed forwardly of the engine E and the burner D' mounted rearwardly of the engine. Figure 2 discloses the engine E as being disposed substantially over the wheels 11. The arrangement of the fans, burners and engine produce a balanced load on the chassis A, thus facilitating coupling of the chassis to the towing vehicle B and producing a load that may be towed readily over the ground F.

Referring now to the details of the fans C and D, it will be observed that the tubular shields 14 are open at their ends, thus permitting air streams to flow therethrough when the fan blades 15 are revolved. The shields carry horizontal trunnions 16, which are mounted in clamp-like bearings 17. Set screws 17a retain the trunnions in adjusted position. The latter are carried by standards 18 rising from the frame 10. The shields 14 are adjustable about the axis of the trunnions 16 so as to swing the axis of the shields (defined by shafts 20) through vertical angles, as suggested in Figure 5. Thus the heated air streams discharged by the fans may be directed downwardly to compensate for the tendency of the hot air to rise. This adjustment has the further advantage of directing the heated air on low-growing plants and shrubs.

These shields have spider-like struts 19 secured thereto. Shafts 20 carry the fan blades 15 and are supported for rotation by the struts 19. Driven pulleys 21 are secured to these shafts, and are operatively connected to a drive pulley 22 on the engine E by belts 23, or other suitable power transmitting means.

The fan C creates an air stream, as suggested by the arrows a, which passes over a heat outlet 24 of the burner C'. The fan D sets up an air stream flowing past a heat outlet 25 of the burner D', as suggested by the arrows b. The heated air streams, suggested by the arrows a and b in Figure 1, are discharged laterally relative to the chassis A in opposite directions.

The heat outlets 24 and 25 are disposed substantially at right angles to the axis of rotations of the fan blades 15, and are arranged adjacent to the lower peripheral sections of the fans. This arrangement not only directs the heat into the air streams, but the tendency of the heat to rise after it leaves the burners will carry the heat directly into the air streams being forced through the fans.

Fuel is supplied to the burners C' and D' by conduits 26 leading from a tank 27. This tank may be carried by the chassis A or by the towing vehicle B. Butane may be used as the fuel. The conduit 26 for each burner conveys fuel through a regulating valve 28 (see Figure 8) and a pipe 29 conveys this fuel to a fuel-air mixing chamber 30. A branch line 31 leads from the pipe 29 to a conventional pilot 32 for the burner.

The burners C' and D' are swingable into various angular positions to change the facings of their heat outlets 24 and 25, respectively, with respect to their respective fans. For this purpose, the main housings 33 of the burners are mounted in clamps 34. (See Figures 7 and 8.) In turn, these clamps are anchored to shoes 35. Trunnions 36 project downwardly from the shoes 35 and pass through bearings 37 carried by bars 38. Set-screws 39 lock the shoes 35 in adjusted position with respect to the bars 38. It will be apparent that the burners may be adjusted about the vertical axes of the trunnions 36 to alter the horizontal facings of the burner outlets.

The ends of the bars 38 are adjustably fastened by horizontally-disposed bolts 40 to bearing blocks 41 carried by the frame 10. The bars 38 are swingable about the axis of the bolts 40 to depress or raise the heat outlet openings 24 and 25 of the burners relative to the air streams flowing through the fans C and D. Set screws 42 are provided for holding the bars 38 in adjusted positions.

Having thus described the various parts of my portable agricultural heater, the operation thereof is summarized as follows:

When the temperature of the atmosphere begins to drop toward the point where the crops in a particular area are apt to suffer frost damage, the chassis A is coupled to the towing vehicle B by the draft bar 12. The burners C' and D' are ignited, and the fans C and D are set in motion by starting the engine E. The entire apparatus is drawn through the area to be heated. During this travel, the fans C and D discharge heated air streams, which are forced laterally in the direction of the arrows a and b, respectively.

In order to compensate for the natural tendency of hot air to rise, the set-screws 17a may be loosened and the fans adjusted about the axes of trunnions 16 so as to incline the axes c of the fans and thus direct the heated air streams toward the ground F (see Figure 5).

Referring to Figures 1–2 and 7–8, the set-screws 42 may be temporarily loosened and the burners tilted about the axes of bolts 40. This will swing the axes d of the burner heat outlets 24 and 25 with respect to the horizontal. Also, the set-screws 39 may be released in order to allow the axes d of the burner outlets to be swung horizontally toward or away from the tubular shields 14. These two adjustments permit the burners to be swung into various angular facings with respect to the fans C and D, respectively.

During an actual test of my portable agricultural heater, which is cited by way of an example only, fans of 4-foot diameters were employed, operating at 1000 revolutions per minute. Each fan displaced between 40,000 and 50,000 cubic feet of air per minute, at a speed of about 45 miles per hour. The burners C and D heated gave 20° Fahrenheit rise to the air streams in the vicinity of the burners. The hot air streams were effective for about 150 feet on each side of the chassis A.

The temperature of the air at the start was 28° Fahrenheit. During the first round through the area, no change in temperature was noted at the 150 foot distance. The second round gave 1° Fahrenheit rise at 150 feet; the third round added 2° Fahrenheit more at 150 feet; and the fourth round brought the temperature of the air to 32° Fahrenheit, where it was maintained by making a trip through the area at 6 minute intervals. It was found that a 10-acre track could be covered every 6 minutes.

In the event that the temperature is lower than 28° Fahrenheit at the start, more trips will be required to bring the air up to 32° Fahrenheit.

Particular attention is called to the fact that the fans C and D are spaced apart along the length of the chassis A. Part of the hot air being blown to the right by the forward fan C will be drawn back by the rear fan D and its temperature raised again by the burner D' before being forced to the left. Likewise, part of the hot air stream flowing from the fan D will be pulled back by the fan C and heated by the burner C'. Thus advantage is taken of the previous heating of the air.

Ordinary smudge pots utilize an oil that produces a heavy black smoke screen. This is very undesirable, especially when the smudging is done near a metropolitan area. By using butane, no smoke screen is produced.

I claim:

1. In a portable agricultural heater: a chassis movable over the ground; a pair of spaced-apart fans offset relative to one another along the length of the chassis and mounted on the chassis for rotation, each about a substantially horizontal axis; said axes extending substantially transversely relative to the chassis; one fan being made to produce an air stream flowing laterally from one side of the chassis; the other fan being made to produce an air stream flowing laterally from the other side of the chassis; the offsetting of the fans with respect to one another being sufficient so that the air stream flowing to and from one fan will be unobstructed by the other fan; burners associated with the fans and having outlets for directing their heat into the air streams; a pair of wheels disposed substantially midway between the fans and supporting the chassis; an engine mounted on the chassis substantially above the wheels; the fans, engine and burners producing a load balanced relative to the wheels; and means operatively connecting the engine to the fans for rotating the latter to move the air streams in the directions aforesaid.

2. In a portable agricultural heater: a chassis movable over the ground; a pair of spaced-apart fans offset relative to one another along the length of the chassis and mounted on the chassis for rotation, each about a substantially horizontal axis; said axes extending substantially transversely relative to the chassis; one fan being made to produce an air stream flowing laterally from one side of the chassis; the other fan being made to produce an air stream flowing laterally from the other side of the chassis; the offsetting of the fans with respect to one another being sufficient so that the air stream flowing to and from one fan will be unobstructed by the other fan; burners associated with the fans and having outlets for directing their heat into the air streams; a pair of wheels disposed substantially midway between the fans and supporting the chassis; an engine mounted on the chassis substantially above the wheels; means operatively connecting the engine to the fans to move the air streams in the directions aforesaid; the fans being mounted on opposite sides of the longitudinal axis of the chassis, with the connecting means between the engine and the fans extending along this axis; the burner associated with one of the fans being disposed on one side of its fan; and the burner associated with the other fan being disposed on the opposite side of its fan; the fans, engine and burners producing a load balanced relative to the wheels.

3. In a portable agricultural heater: a chassis movable over the ground; a pair of spaced-apart tubular wind-directing shields mounted on the chassis, with the axes of these shields extending substantially transversely to the chassis; each shield providing a passageway having suction and discharge ends communicating directly with the atmosphere; a pair of rotatably-supported fans, each being aligned with a passageway of a shield; one fan being made to produce an air stream flowing through the passageway of one shield for discharge laterally from one side of the chassis; the other fan being made to produce an air stream flowing through the passageway of the other shield for discharge laterally from the opposite side of the chassis; means for rotating the fans to move the air streams in the directions aforesaid; these shields being offset relative to each other along the length of the chassis so that the confines of one shield is disposed entirely to the side and beyond the confines of the other shield; the suction and discharge ends of each shield being unobstructed by the other shield, whereby the air stream of each shield will be unimpeded by the other shield; and burners having outlets positioned to direct heat into the air streams.

4. The combination as defined in claim 3, in which the means for rotating the fans includes an engine mounted substantially midway between the shields, with one fan and its associated burner disposed on each side of the engine.

5. The combination as defined in claim 3, in which the tubular wind-directing shields are placed sufficiently close together so that part of the hot air stream being blown laterally from the outlet of each shield will expand into the zone of suction created by the fan of the other shield and will be forced through the latter for further heating, thereby establishing transverse circulation of air having increased temperature over previous heating of the air.

GEORGE T. NEUNDORFER.

REFERENCES CITED

The following references are of record in the file of this patent:

UNITED STATES PATENTS

| Number | Name | Date |
|---|---|---|
| 641,990 | Neyens | Jan. 23, 1900 |
| 1,793,719 | Reader | Feb. 24, 1931 |
| 1,864,198 | Johnson | June 21, 1932 |
| 1,903,615 | Towt | Apr. 11, 1933 |
| 2,041,969 | Seymour | May 21, 1936 |
| 2,223,597 | Brewster | Dec. 3, 1940 |
| 2,231,454 | Saxe | Feb. 11, 1941 |
| 2,315,096 | Sanderson | Mar. 30, 1943 |